Nov. 21, 1967   D. M. NELSON   3,353,793

CABLE RETAINER

Filed July 1, 1966

INVENTOR.
DONALD M. NELSON
BY
Sidney Magnes 3,353,793
CABLE RETAINER
Donald M. Nelson, Anaheim, Calif., assignor to
North American Aviation, Inc.
Filed July 1, 1966, Ser. No. 562,221
7 Claims. (Cl. 254—190)

ABSTRACT OF THE DISCLOSURE

A structure, mounted to encircle a drum adapted to have a cable wound thereon, having rollers that ride on and constrain the turns of said cable from uncoiling when a slack-load condition exists.

---

This invention relates to a cable retainer; and more particularly to an arrangement for retaining a cable on a reel while the reel is rotating, reversing its direction of rotation, or while the cable is undergoing changes in load.

Background

There are many devices that use cables for lifting, pulling, or for control purposes; examples of these devices being derricks, cranes, lifts, elevators, and the so-called Rogallo wing—which is a flexible-wing kite-like vehicle having a load platform suspended beneath the wing. The glide-path of the Rogallo wing may be controlled by adjusting the configuration of the flexible wing, or by adjusting the position of the load platform relative to the wing—these adjustments being made by paying-out or reeling-in cables interconnecting the wing and the load platform. In all these devices, the cable is wound on a reel, and the reel is rotated by means such as motors.

When the load is being reeled-in or payed-out smoothly, the coils of cable on the reel maintain tightly wound adjacent positions; but when the load is relieved, the exiting coils of wound cable tend to expand slightly, and tend to tangle and/or leave the reel.

Objects and drawings

It is therefore an object of the present invention to provide an improved cable retainer.

The attainment of this object, and others, will be realized from the teachings of the specification; taken in conjunction with the drawings, of which FIGURE 1 shows one embodiment of the disclosed cable retainer;

Introduction

It is known that when a load-cable is wound on a reel, the winding may be of the "push-pull" type, wherein one end of the cable is to be pulled-in at the same time that the other end is being payed-out. To achieve this result, the load-cable has its center portion wound upon the reel. Alternatively, if this "push-pull" arrangement is not desired, one end of the load-cable is anchored to the reel, and the rest of the cable is wound upon the reel; and, as the reel is rotated by a motor, the free end of the load-cable is payed-out or reeled-in.

When the load cable is wound onto its reel, the winding generally forms a series of adjacent turns of cable that extend across the face of the reel; the reel being either smooth or grooved to accept the cable. In order to permit orderly operation of the push-pull arrangement previously described, the turns of cable are only one layer thick. Under some conditions of operation, the load-cable often develops a slack; and this slackness tends to permit certain turns of the cable to liberate themselves from the reel, and to either become entangled with other turns, or to slip off the reel completely. In the past, some reels have been made with very high end-flanges in order to prevent this situation; but this structure is not completely satisfactory, as it produces a heavy reel, and under some conditions interferes with the movement of the load-cable.

Description of the invention

Figure 1:
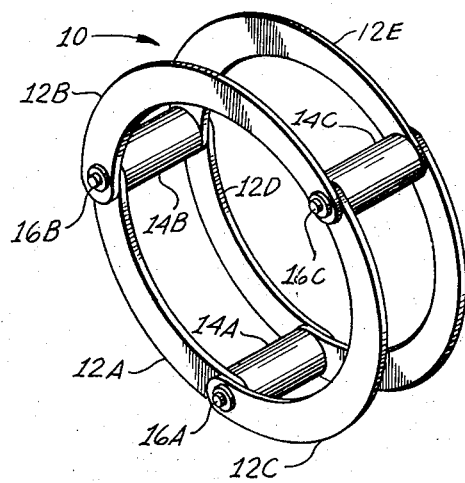

The invention may be understood from FIGURE 1. This illustrates a cable retainer 10 shown as comprising a plurality of arcuate links 12A, 12B, 12C, etc.; any given number of links being assembled to form a circle having a selected inner diameter to be discussed later. Alternatively, the linked-rings may be replaced by solid rings; but the linked arrangement is easier to assemble onto the reel. Links 12 are connected into two spaced-apart circles by means of three or more transverse rollers 14A, 14B, and 14C that are rotably positioned by pins 16A, 16B, and 16C; the ends of these pins being locked in any suitable manner, such as by nuts or friction washers. If desired, the rollers 14 and pins 16 may be integral.

Figure 2:
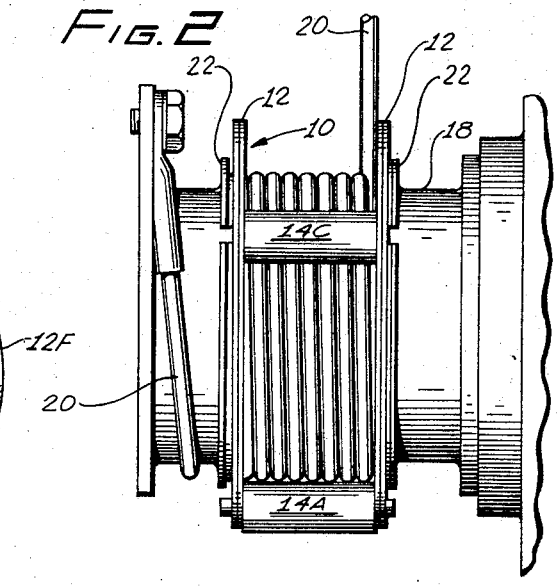
FIGURES 2 and 3 show the operation of the cable retainer.
Figure 3:
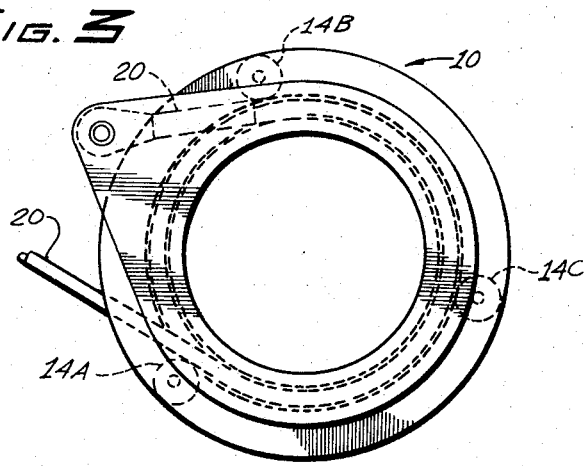

In operation, cable-retainer 10 fits on a motor-driven cable -wound reel 18—as shown in FIGURES 2 and 3—which show an arrangement wherein one end of a load-cable 20 is securely bolted to a portion of reel 18 having flanges 22, and cable-retainer 10 fits between flanges 22 and over the windings of the load-cable. It will be noted that the inner diameter of cable-retainer 10 is slightly larger than the diameter of the cable-wound reel 18, and is slightly smaller than the other diameter of flange portions 22 of reel 18. In this way the cable-retainer is maintained on reel 18. Thus, rollers 14 ride on the turns of cable, and clear the wound cable by a slight amount.

Referring to FIGURE 3, as cable 20 is payed-out, the reel 18 and the cable-retainer 10 both rotate clockwise. Reel 18 continues to rotate as the cable is payed-out, but the cable-retainer 10 stops its rotation when one of its rollers—such as 14A—touches the exiting cable 20. At this time, the exiting cable rides between reel 18 and roller 14A; the cable-retainer 10 ceases to rotate; and the individual rollers 14A, 14B, 14C revolve in conjunction with the cable movement adjacent to the rollers. Thus, cable-retainer 10 continues to rotate on reel 18 in a "free-wheeling" manner. It may be understood that the exiting cable and the last coil thereof is now constrained in the space between the reel and the roller; and if any slack occurs in the cable, the slack is not permitted to affect the wound coils of cable on the reel.

If the operation is reversed, and the cable is reeled onto reel 18, the reel and the cable-retainer both rotate counter clockwise; the reel continuing its rotation, but the cable-retainer stopping its rotation when one of its rollers—such as 14B—touches the entering cable. The, cable-retainer continues to rotate on reel 18 in a free-wheeling manner. At this time the entering cable, and particularly the last coil thereof, is again constrained in the space between the drum and roller 14A; and again, slack is not permitted to affect the wound coils of cable on the reel.

In this way, cable-retainer 10 is free-wheeling, causes the load-cable 20 to remain securely wound on the reel in an orderly fashion; permits freely paying-out or reeling-in of the load-cable; and still prevents a slack condition from causing the load-cable 20 to become entangled or free from the reel.

While the illustration shows three rollers, it is obvious that a larger number of rollers may be used.

Figure 4:
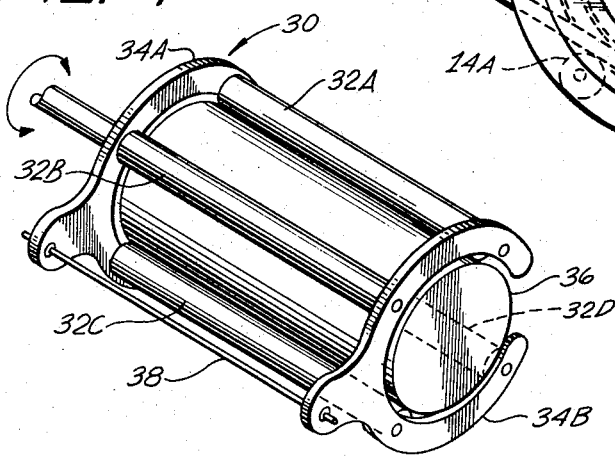
FIGURE 4 shows another embodiment of the disclosed cable retainer.

FIGURE 4 shows a multi-roller fixedly-positioned type of cable-retainer, 30; this being especially useful for devices that use lighter cables that may not be able to stop the rotation of the free-wheeling cable-retainer previously described. Cable-retainer 30 operates similarly to the one described previously, except that it is shown to have four rollers 32A, 32B, 32C, and 32D that are rotatably mounted in a resilient frame 34A, 34B, and are thus in rotatable contact with a reel 36 on which a cable (not shown) is wound. The radial resiliency of frames 34A, and 34B, assure that the rollers are held in rotatable contact with the coils of the cable; and a mounting rod 38 mounts the cable-retainer 30 in proper location to position the rollers without applying undue pressure on the cable. As in the prior embodiment, the cable is constrained between the drum and the rollers; and slackness is prevented from permitting the turns of cable to loosen or become entangled.

The arrangement of FIGURE 4 is particularly useful when a plurality of relatively lightweight cables are mounted on the same reel; and yet must be prevented from tangling.

What is claimed is:

1. A cable-retainer for retaining coils of cable on a reel, comprising:
    a plurality of rollers; and
    means for positioning said plurality of rollers in substantially rolling contact with the coils of cable on said reel, said positioning means comprising a pair of spaced-apart parallel arcuate supports positioned substantially perpendicular to the axis of said reel, with the rollers mounted transversely between said supports parallel to the axis of said reel—whereby each roller of said plurality constrains the coils of cable said supports being in the form of rings, and said cable-retainer is free-wheeling in its ability to roll relative to said reel and coiled cable.

2. The combination of claim 1 wherein said supports are in the form of linked rings, and said cable-retainer is free-wheeling in its ability to roll relative to said reel and coiled cable.

3. The combination of claim 1 wherein said reel comprises flange means for substantially preventing axial movement of the free-wheeling cable-retainer.

4. In combination with a cable reel having side flanges and a cable wound thereon, a free-wheeling cable-retainer comprising:
    a pair of mutually spaced rings circumscribing the reel between the flanges, and having an inner diameter less than the outer diameter of the flanges; and
    a plurality of rollers, each roller having one end journaled in one ring and the other end journaled in the other ring, said roller circumscribing a circle having a diameter slightly greater than the diameter of the reel with the cable thereon for causing the rollers to be in rolling contact with at least one turn of the wound cable.

5. The combination of claim 4 whereto each said ring comprises a plurality of substantially flat interconnected arcuate segments.

6. The combination of claim 5 wherein said rollers are journalled at the interconnecting point of adjacent said arcuate segments.

7. The combination of claim 4 wherein said circumscribing rings and rollers extend across substantially the entire width of the reel between said side flanges, and are constrained against axial movement relative to the reel by said side flanges.

References Cited

UNITED STATES PATENTS

| | | | |
|---|---|---|---|
| 3,226,090 | 12/1965 | Sauerbrey | 254—190 |

FOREIGN PATENTS

| | | |
|---|---|---|
| 30,198 | 7/1964 | Germany. |
| 13,325 | 1/1956 | Germany. |
| 539,161 | 2/1956 | Italy. |

EVON C. BLUNK, *Primary Examiner.*

H. C. HORNSBY, *Assistant Examiner.*